3,353,909
THERMALLY STABILIZED ALKALI METAL DITHIONATES

Alfons Janson and Franz Poschmann, Ludwigshafen (Rhine), Germany, assignors to Badische Anilin- & Soda-Fabrik Aktiengesellschaft, Ludwigshafen (Rhine), Germany
No Drawing. Filed Dec. 17, 1963, Ser. No. 331,094
Claims priority, application Germany, Dec. 22, 1962, B 70,119
4 Claims. (Cl. 23—116)

ABSTRACT OF THE DISCLOSURE

Essentially anhydrous mixtures of finely-divided, alkali metal dithionites and 2–20% by weight of urea, the latter as a stabilizer against self-ignition of the dithionite.

---

This invention relates to dithionites whose self-ignitability has been decreased by additives.

Sodium dithionite ($Na_2S_2O_4$) is extensively used in the paper industry as a bleaching agent and in dyeing as a reducing agent for reducing dyes. The commercially available powdered and anhydrous sodium dithionite may be kept for long periods in dry air, but undergoes rapid decomposition under the influence of water or moisture. Under the influence of liquid water, the dihydrate of the dithionite is first formed with the development of heat. This dihydrate is oxidized particularly readily by free oxygen so that the temperature is further increased by the heat of oxidation liberated. If the heat formed by the said reactions is not removed rapidly enough, a third exothermic reaction may occur, namely spontaneous decomposition of the salt with the disengagement of sulfur dioxide and the formation of thiosulfate, bisulfite and sulfur. In this spontaneous decomposition, 10,350 calories are liberated per mole of sodium dithionite (O. V. Deines, G. Elstner, Z. anorg. Chem. 191 (1930) 340–381). The heat liberated by these reactions may be so great that the temperature of the decomposing composition may rise above the ignition point of sulfur which is at about 230° C., so that the composition finally begins to burn.

This decomposition of dithionites constitutes a serious risk for the manufacturer and the consumer. This risk is particularly serious where large amounts of hydrosulfite are being used and where water is present, conditions obtaining for example in paper works.

It is known that the decomposition of dithionites involves less risks if they are diluted with inert substances, for example sodium phosphate. In order to achieve this effect, however, such an amount, for example 40 to 50%, of the diluent has to be added, for example, to sodium dithionite that industrial and economic disadvantages are involved, for example, undesirable entrainment of extraneous salts into the vats or bleaching liquors, and increased transportation costs.

It is an object of the present invention to provide a mixture containing dithionites in a high percentage and which are not self-igniting.

We have now found that this object is achieved by mixtures containing urea besides a dithionite.

Very small amounts of urea are sufficient to achieve the intended purpose. Thus it is possible for example to obtain non-flammable mixtures which contain as much as 89% of sodium dithionite. In general the amount of urea added may be within the range of 2 to 20% by weight, preferably 5 to 15% by weight, with reference to the dithionite. The absence of self-ignitability in the mixtures according to this invention is more reliably ensured the finer the state of division of, for example, sodium dithionite and urea in the mixture. This discovery is surprising because it is generally known that finely divided hydrosulfites are particularly readily decomposable because of their large surface.

The same effect is achieved with mixtures containing salts of dithionic acid other than sodium dithionite, for example potassium dithionite.

The invention is further illustrated by the following examples. The parts in the following examples are parts by weight.

EXAMPLE 1

12.5 kg. of a mixture of 90 parts of hydrosulfite having a sodium dithionite content of 95% and 10 parts of urea is placed in a sheet metal container having a capacity of 20 liters and 500 g. of water is poured over the mixture. Another 12.5 kg. of the same mixture is immediately added to the moist salt composition. After standing for about seven hours, marked disengagement of smoke can be observed. The smoke has a slight irritant action and smells weakly of ammonia. No odor of sulfur dioxide can be detected. No formation of flame or glow takes place during the whole of the experiment.

EXAMPLE 2

A mixture consisting of 400 parts of hydrosulfite, (sodium dithionite content 90% by weight), and 45 parts of urea is prepared under nitrogen in a ball mill. 100 g. of this mixture is placed in a vacuum flask holding 250 cc. 3 cc. of water is dripped onto this mixture and the whole stirred with a thermometer.

In a second experiment carried out in parallel, 100 g. of unmixed hydrosulfite is treated with the same amount of water in the same way.

In the following table the temperatures reached in the two tests are plotted against time.

TABLE

| Time in minutes | Temperature in ° C. of— | |
|---|---|---|
| | Hydrosulfite alone | Mixture |
| 0 | 25 | 23 |
| 15 | 76 | 76 |
| 27 | | 109 |
| 28 | 118 | |
| 33 | 161 | |
| 39 | | 149 |
| 44 | 311 | 180 |
| 48 | | 204 |
| 53 | 317 | |
| 58 | 312 | 196 |
| 74 | | 157 |
| 75 | 293 | |
| 97 | 259 | 132 |
| 114 | 214 | 96 |
| 136 | 171 | |
| 160 | 138 | |
| 205 | 95 | |

It may be seen from the table that in the case of the mixture, the maximum temperature which occurs is considerably below the ignition temperature of sulfur. It is also evident that the fall in temperature in the case of the mixture takes place much more quickly than in the case of unmixed hydrosulfite.

We claim:
1. An essentially anhydrous mixture of finely-divided, essentially dry, alkali metal dithionite and, as a stabilizer against self ignition of said dithionite, 2–20% by weight, based on said dithionite, of urea.

2. An essentially anhydrous, hydrosulfite composition stabilized against self ignition by decomposition of the hydrosulfite in the presence of water and free oxygen, said composition consisting essentially of a mixture of finely-divided, essentially dry, alkali metal dithionite and 2–20% by weight, based on said dithionite, of urea.

3. A mixture as claimed in claim 1, wherein said alkali metal dithionite is sodium dithionite.

4. A composition as claimed in claim 2, wherein said alkali metal dithionite is sodium dithionite.

References Cited

FOREIGN PATENTS 786,212   11/1957   Great Britain.

EARL C. THOMAS, *Primary Examiner.*